US009377851B2

(12) United States Patent
Sawada

(10) Patent No.: US 9,377,851 B2
(45) Date of Patent: Jun. 28, 2016

(54) INFORMATION PROCESSING APPARATUS, INFORMATION PROCESSING METHOD, AND COMPUTER PROGRAM

(71) Applicant: SONY CORPORATION, Tokyo (JP)

(72) Inventor: Tsutomu Sawada, Tokyo (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 13/758,244

(22) Filed: Feb. 4, 2013

(65) Prior Publication Data
US 2013/0257723 A1  Oct. 3, 2013

(30) Foreign Application Priority Data

Mar. 29, 2012 (JP) ................... 2012-076211

(51) Int. Cl.
G06F 3/033 (2013.01)
G06F 3/01 (2006.01)
(52) U.S. Cl.
CPC ............... G06F 3/012 (2013.01); G06F 3/017 (2013.01)
(58) Field of Classification Search
CPC .......... G06F 3/012; G06F 3/017; G09G 3/012
See application file for complete search history.

(56) References Cited

U.S. PATENT DOCUMENTS

| 6,677,969 | B1* | 1/2004 | Hongo | 715/863 |
| 8,640,226 | B2* | 1/2014 | Chaturvedi et al. | 726/19 |
| 2006/0204135 | A1* | 9/2006 | Funakura | 382/291 |
| 2009/0091530 | A1* | 4/2009 | Yoshida | 345/156 |
| 2011/0029921 | A1* | 2/2011 | Terada et al. | 715/810 |
| 2011/0304541 | A1* | 12/2011 | Dalal | 345/158 |

FOREIGN PATENT DOCUMENTS

| JP | 2007-310914 | | 11/2007 |
| JP | 2008-146243 | | 6/2008 |
| JP | 2010077418 A | * | 4/2010 |
| JP | 2011-513847 | | 4/2011 |

* cited by examiner

Primary Examiner — Adam R Giesy
(74) Attorney, Agent, or Firm — Paratus Law Group, PLLC

(57) ABSTRACT

There is provided an information processing apparatus including an operation detection unit configured to detect an orientation of a user's face and operations performed by the user, and an area selection unit configured to, when the operation detection unit detects that the user has performed a first operation, select an area on a screen based on the orientation of the user's face during the first operation.

19 Claims, 16 Drawing Sheets

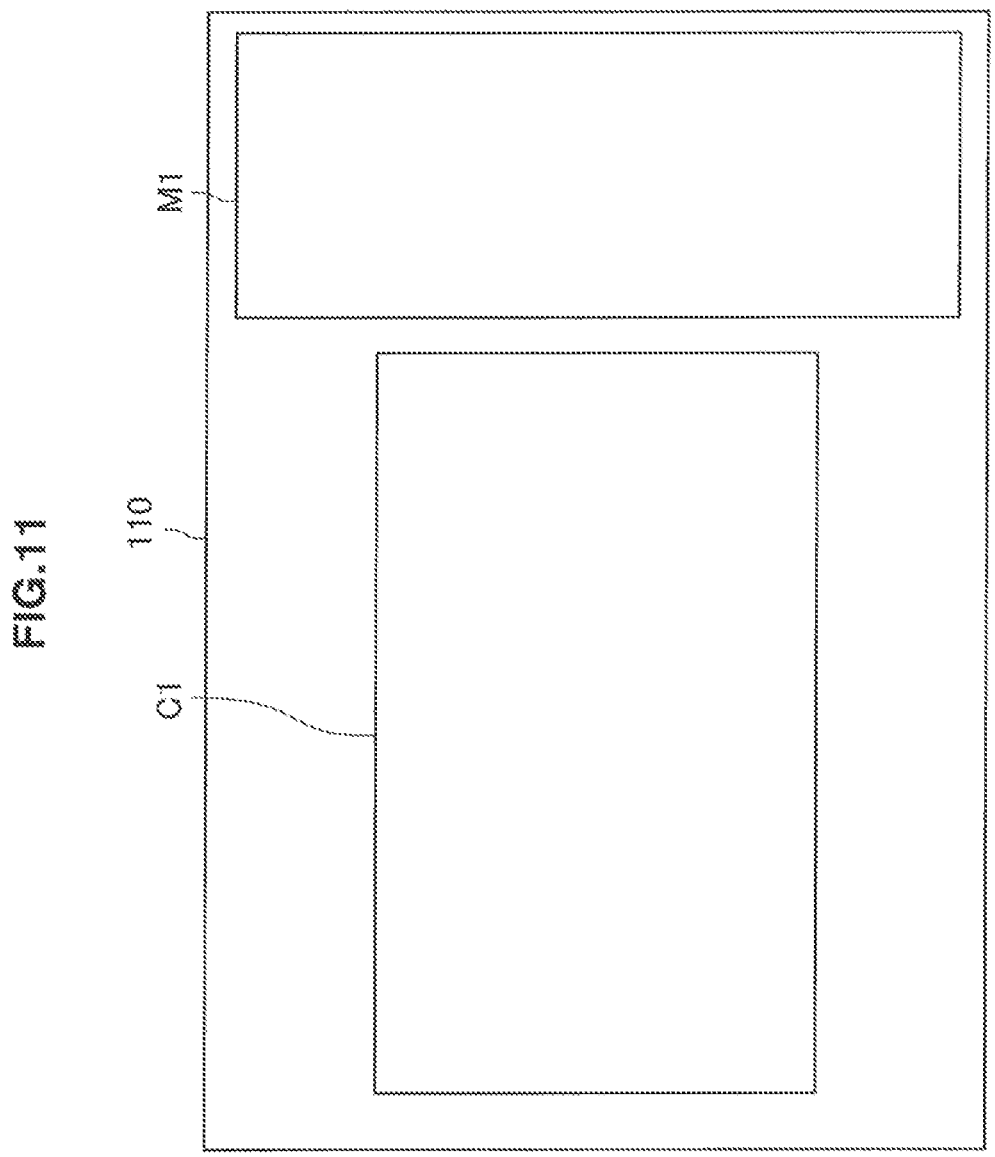

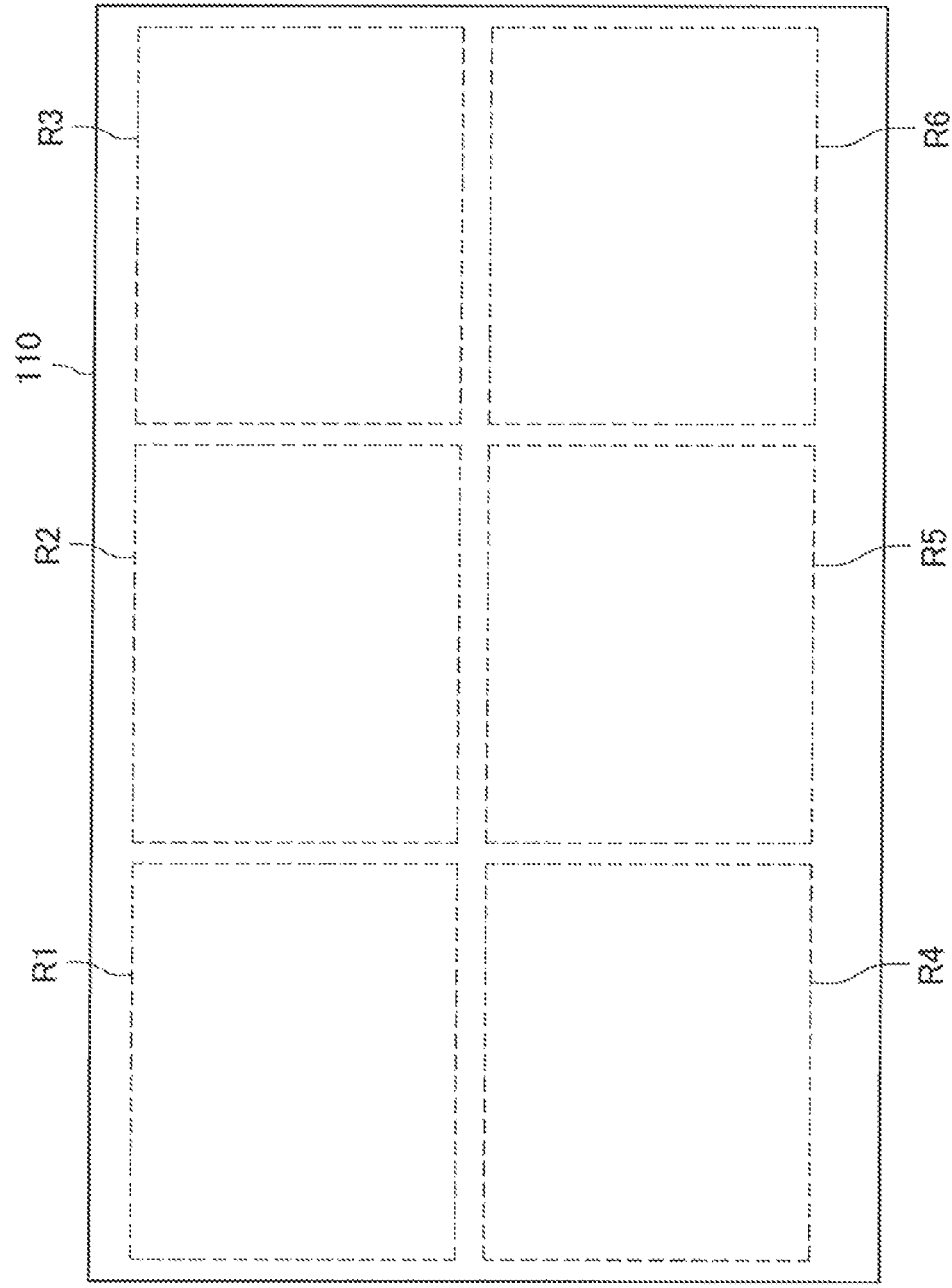

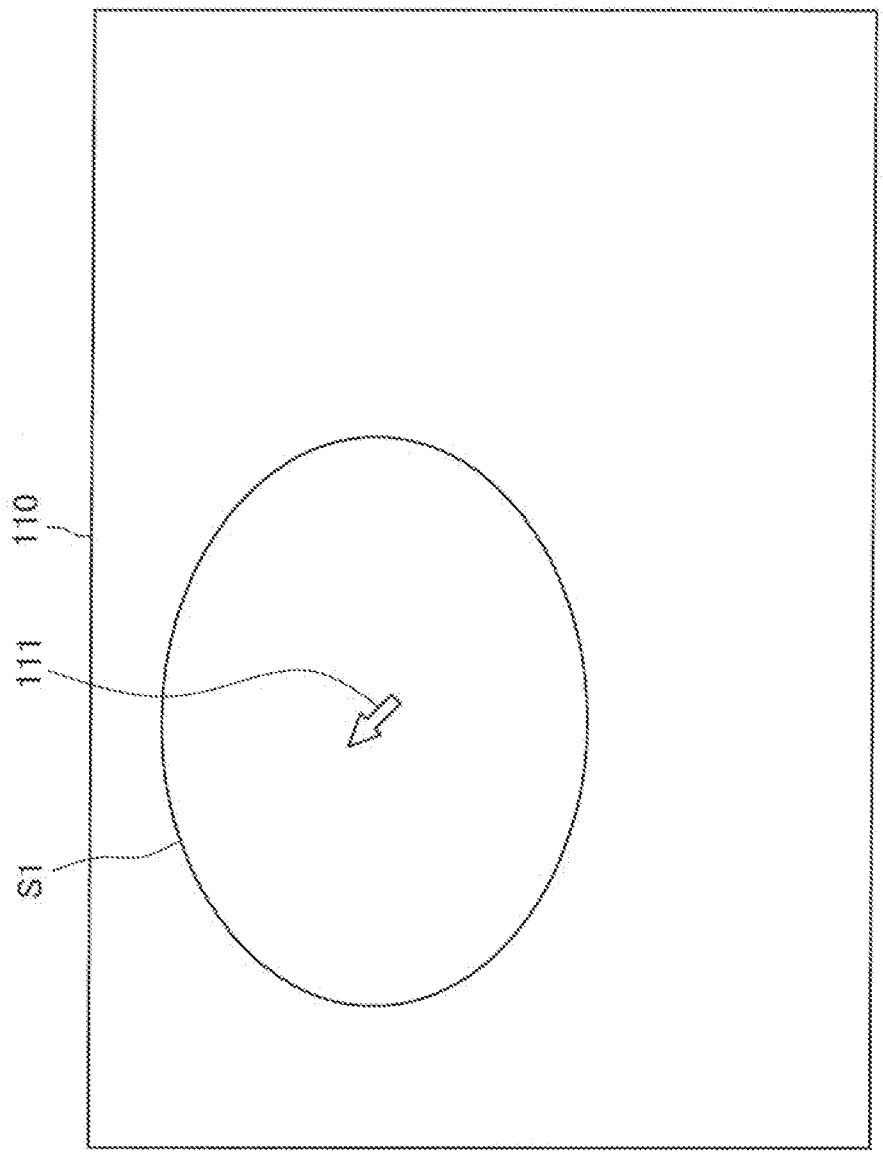

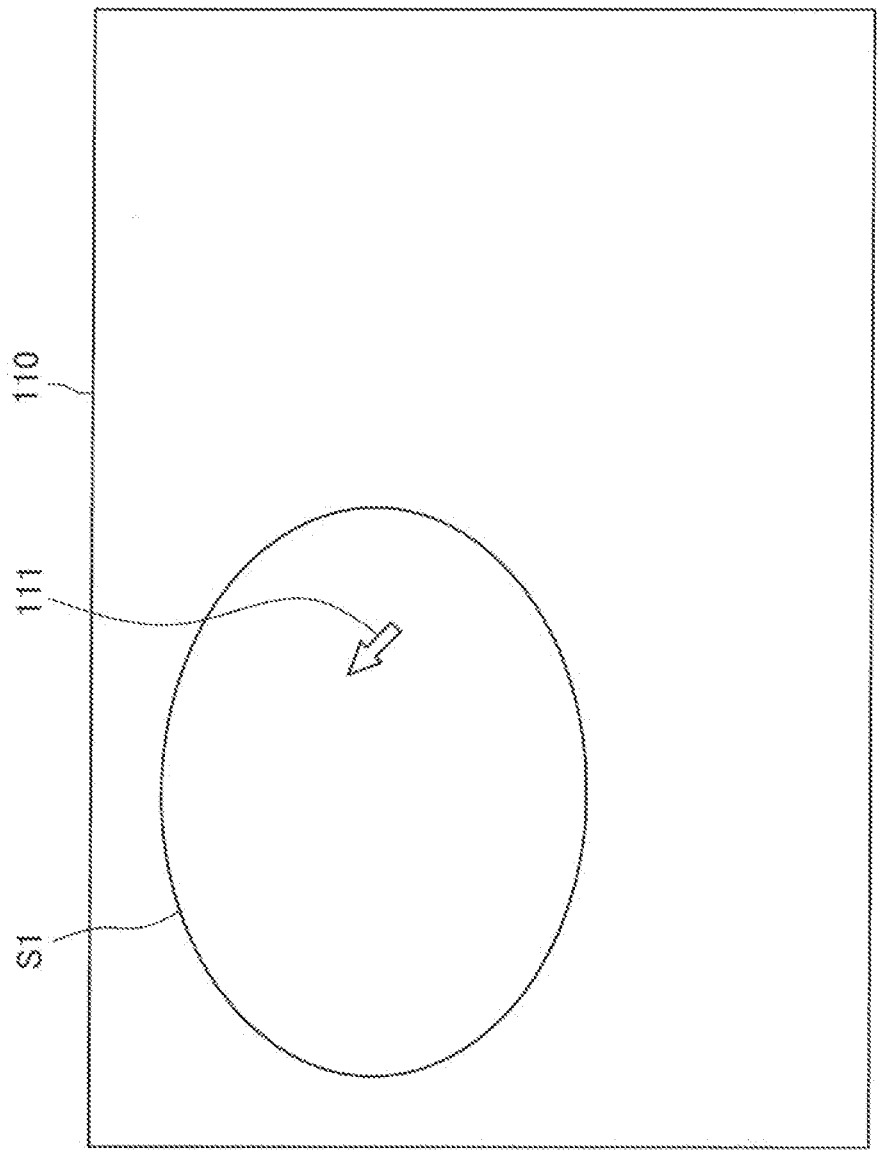

INFORMATION PROCESSING APPARATUS, INFORMATION PROCESSING METHOD, AND COMPUTER PROGRAM

BACKGROUND

The present disclosure relates to an information processing apparatus, an information processing method, and a computer program.

Technology exists for operating a television, a personal computer and the like based on user gestures without the use of a keyboard, a mouse, or a remote controller (refer to JP 2008-146243A, JP 2007-310914A, and JP 2011-513847T, for example). If such a technology is used, a television, a personal computer and the like can be remotely operated without the use of an operation unit, such as a keyboard, a mouse, or a remote controller.

For example, the technology described in JP 2008-146243A executes most functions using a few gestures to stop unintended functions. Further, the technology described in JP 2007-310914A executes a remote operation by detecting movement of facial parts. In addition, the technology described in JP 2011-513847T provides selection of underlying icon functionality through straightforward, intuitive, and natural motions of the user's body.

SUMMARY

Thus, although technology exists for remote operation of a television, a personal computer and the like based on user gestures, when performing a remote operation by detecting only the orientation of a face or movement of facial parts, the large movements of the cursor displayed on a large screen of 50-inches or more, for example, make it different to precisely specify a position. Further, when performing a remote operation by detecting only the user's hand movements, although precise movements of the cursor displayed on the screen may be possible, large movements of the cursor displayed on the screen are difficult.

Therefore, according to an embodiment of the present disclosure, provided are a new and improved information processing apparatus, information processing method, and computer program, which are capable of facilitating a remote operation performed based on detection of a specific gesture when a user performs a gesture-based remote operation.

According to an embodiment of the present disclosure, there is provided an information processing apparatus including an operation detection unit configured to detect an orientation of a user's face and operations performed by the user, and an area selection unit configured to, when the operation detection unit detects that the user has performed a first operation, select an area on a screen based on the orientation of the user's face during the first operation.

According to such a configuration, an operation detection unit detects the orientation of a user's face and operations performed by the user. When the operation detection unit detects that the user has performed a first operation, an area selection unit selects an area on the screen based on the orientation of the user's face during the first operation. Consequently, the information processing apparatus can facilitate a remote operation that is performed based on detection of a specific gesture when a user performs a gesture-based remote operation.

Further, according to an embodiment of the present disclosure, there is provided an information processing method including detecting an orientation of a user's face and operations performed by the user, and when performance of a first operation by the user is detected, selecting an area on a screen based on the orientation of the user's face during the first operation.

Further, according to an embodiment of the present disclosure, there is provided a computer program configured to make a computer detect an orientation of a user's face and operations performed by the user, and when performance of a first operation by the user is detected, select an area on a screen based on the orientation of the user's face during the first operation.

Thus, according to the embodiments of the present disclosure described above, a new and improved information processing apparatus, information processing method, and computer program can be provided that are capable of facilitating a remote operation performed based on detection of a specific gesture when a user performs a gesture-based remote operation.

BRIEF DESCRIPTION OF THE DRAWINGS

FIG. 11 is an explanatory diagram illustrating an example of a screen displayed on a display unit 110 in a display apparatus 100;

FIG. 12 is an explanatory diagram illustrating an example of a screen displayed on a display unit 110 in a display apparatus 100;

FIG. 13A is an explanatory diagram illustrating an example of a screen displayed on a display unit 110 in a display apparatus 100;

FIG. 13B is an explanatory diagram illustrating an example of a screen displayed on a display unit 110 in a display apparatus 100.

DETAILED DESCRIPTION OF THE EMBODIMENT(S)

Figure 1:
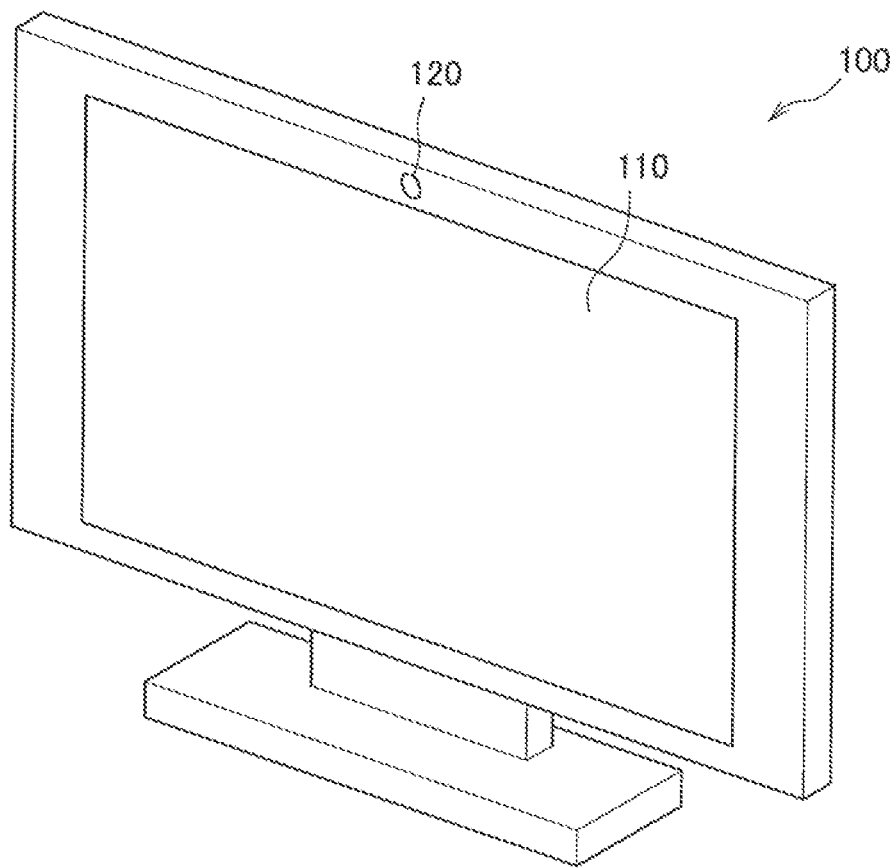
FIG. 1 is an explanatory diagram illustrating an appearance example of a display apparatus 100 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made based on the following order.
<1. Embodiment of the Present Disclosure>
[Display Apparatus Appearance Example]
[Display Apparatus Function Configuration Example]
[Display Apparatus Operation]
<2. Summary>
<1. Embodiment of the Present Disclosure>
[Display Apparatus Appearance Example]

First, an appearance example of a display apparatus according to an embodiment of the present disclosure will be described. FIG. 1 is an explanatory diagram illustrating an appearance example of a display apparatus 100 according to an embodiment of the present disclosure. The appearance of the display apparatus 100 according to an embodiment of the present disclosure will now be described with reference to FIG. 1.

The display apparatus 100 illustrated in FIG. 1, which is an example of the information processing apparatus according to the present disclosure, detects user gestures and executes processing based on those gestures. As illustrated in FIG. 1, the display apparatus 100 according to an embodiment of the present disclosure includes a display unit 110 and a camera 120.

The display unit 110 displays images based on a supplied signal. The camera 120, which is provided in the same direction as the display surface of the display unit 110, captures images of objects facing the display surface of the display unit 110. The display apparatus 100 illustrated in FIG. 1 is configured to detect user gestures from images captured by the camera 120, and execute processing based on those gestures.

The display apparatus 100 illustrated in FIG. 1 may be any device, as long as it is configured to detect user gestures from images captured by the camera 120, and execute processing based on those gestures. For example, this display apparatus 100 may be a television, a monitor connected to a personal computer or some other information processing apparatus, or a projector.

An appearance example of the display apparatus 100 according to an embodiment of the present disclosure was described above with reference to FIG. 1. Next, a function configuration example of the display apparatus 100 according to an embodiment of the present disclosure will be described.
[Display Apparatus Function Configuration Example]

Figure 2:
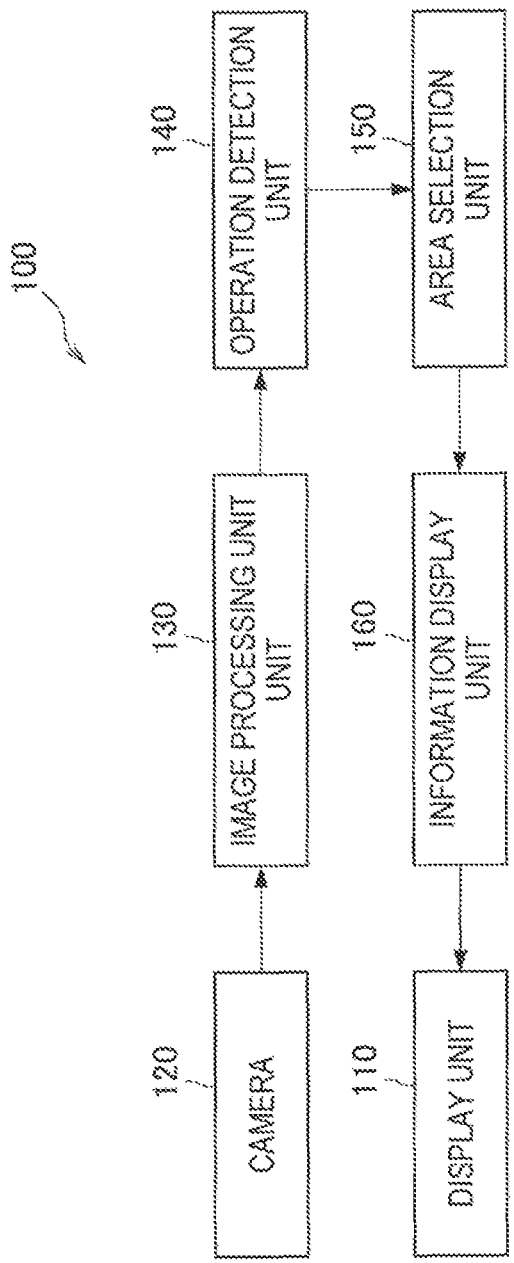
FIG. 2 is an explanatory diagram illustrating a function configuration example of a display apparatus 100 according to an embodiment of the present disclosure.

FIG. 2 is an explanatory diagram illustrating a function configuration example of the display apparatus 100 according to an embodiment of the present disclosure. A function configuration example of the display apparatus 100 according to an embodiment of the present disclosure will now be described with reference to FIG. 2.

As illustrated in FIG. 2, the display apparatus 100 according to an embodiment of the present disclosure includes the display unit 110, the camera 120, an image processing unit 130, an operation detection unit 140, an area selection unit 150, and an information display unit 160.

As described above, the display unit 110 displays images based on a supplied signal. In this embodiment according to the present disclosure, the display unit 110 displays information based on a signal supplied from the information display unit 160. Examples of the display unit 110 include display devices such as a liquid crystal display panel, an organic EL display panel, and a plasma display panel. If the display apparatus 100 is an apparatus like a projector that displays information by projecting an image on a wall surface and the like, the display unit 110 may be configured from the device projecting that image or a display surface on which that device displays the projected image.

As described above, the camera 120, which is provided in the same direction as the display surface of the display unit 110, captures images of objects facing the display surface of the display unit 110. The camera 120 includes, for example, an image sensor such as a CCD image sensor or a CMOS image sensor. The camera 120 can obtain data that will serve as the basis of the image data by converting light that is incident on the image sensor via a lens into an electric signal. The camera 120 supplies the electric signal to the image processing unit 130.

The image processing unit 130 obtains image data by performing predetermined signal processing on the electric signal obtained by the camera 120. Examples of predetermined signal processing performed by the camera 120 include noise reduction processing, white balance processing and the like. The image processing unit 130 supplies the image data obtained by performing signal processing to the operation detection unit 140.

The operation detection unit 140 detects operations made by the user facing the display surface of the display unit 110 using the image data supplied from the image processing unit 130. When a user operation is detected using the image data, the operation detection unit 140 outputs a detection result to the area selection unit 150. During detection of user operations using the image data, the operation detection unit 140 executes, for example, face recognition processing and processing for detecting a predetermined operation by the user.

The area selection unit 150 selects an area from among the display area of the display unit 110 using the user operation detection result from the operation detection unit 140. The area selection processing performed by the area selection unit 150 will be described in more detail below. When an area has been selected from among the display area of the display unit 110, the area selection unit 150 supplies information about the selected area to the information display unit 160.

The information display unit 160 makes the display unit 110 display predetermined information on the area in the display area of the display unit 110 selected by the area selection unit 150. The predetermined information displayed by the information display unit 160 on the display unit 110 is information that lets the user perform an operation or make a selection, such as a cursor, an icon, a menu screen or the like.

A function configuration example of the display apparatus 100 according to an embodiment of the present disclosure was described above with reference to FIG. 2. Next, a function configuration example of an operation detection unit 140 included in the display apparatus 100 according to an embodiment of the present disclosure will be described.

Figure 3:
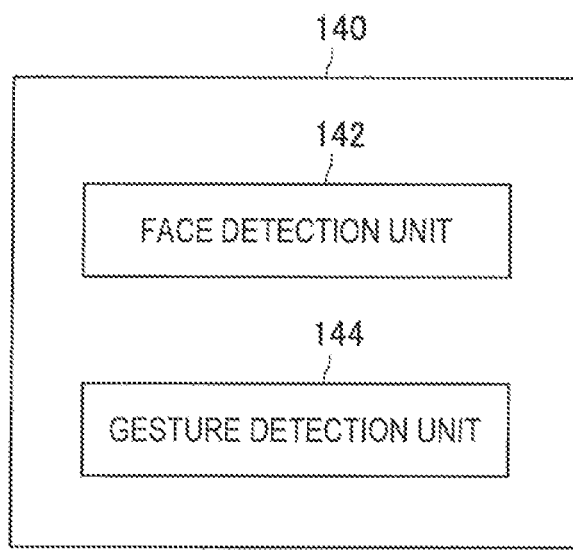
FIG. 3 is an explanatory diagram illustrating a function configuration example of an operation detection unit 140 included in a display apparatus 100 according to an embodiment of the present disclosure.

FIG. 3 is an explanatory diagram illustrating a function configuration example of the operation detection unit 140 included in the display apparatus 100 according to an embodiment of the present disclosure. A function configuration example of the operation detection unit 110 included in the display apparatus 100 according to an embodiment of the present disclosure will now be described with reference to FIG. 3.

As illustrated in FIG. 3, the operation detection unit 140 included in the display apparatus 100 according to an embodiment of the present disclosure includes the face detection unit 142 and a gesture detection unit 144.

Using the image data supplied from the image processing unit 130, the face detection unit 142 detects whether a face is included in the image data. Further, if a face is included in the image data, the face detection unit 142 estimates what position in the display area of the display unit 110 is indicated by that face.

Using the image data supplied from the image processing unit 130, the gesture detection unit 144 detects a predetermined gesture performed by the user toward the display unit 110. The operation detection unit 140 outputs a face detection result by the face detection unit 142 and a gesture detection result by the gesture detection unit 144 to the area selection unit 150. The area selection unit 150 can use the face detection result by the face detection unit 142 and the gesture detection result by the gesture detection unit 144 supplied from the operation detection unit 140 to select an area from among the display area of the display unit 110.

A function configuration example of the operation detection unit 140 included in the display apparatus 100 according to an embodiment of the present disclosure was described above. Next, operation of the display apparatus 100 according to an embodiment of the present disclosure will be described.

The display apparatus 100 according to an embodiment of the present disclosure can detect the face of a user who is facing the display screen of the display unit 110 in the display apparatus 100 and gestures made by the user from the image data obtained by capturing an image with the camera 120. The display apparatus 100 can select an area from the display area of the display unit 110 in the display apparatus 100 (e.g., a position or a range on the display area) based on a detection result of the user's face and gestures made by the user. Further, the display apparatus 100 can also display information (e.g., a cursor, a menu etc.) on that selected area.

In the following description, as an example of the operation of the display apparatus 100 according to an embodiment of the present disclosure, processing will be described for detecting the face and gestures of a user who is facing the display surface of the display unit 110 in the display apparatus 100 from image data obtained by capturing an image with the camera 120, and displaying a cursor on a position corresponding to the orientation of the user's face on the display unit 110. Further, processing will also be described for detecting a gesture made by a user facing the display surface of the display unit 110 in the display apparatus 100, and moving the cursor based on that gesture.

Processing performed by the face detection unit 142 for estimating a face position in a display unit-centered coordinate system centered on the display unit 110 in the display apparatus 100 that uses a face detection position based on image coordinates will now be described in detail. First, the face detection unit 142 converts a face detection position based on image coordinates into an image-centered coordinate system face position, and then converts this face position into a face position in a camera-centered coordinate system. Then, the face detection unit 142 converts the face position in a camera-centered coordinate system into a face position in a display unit-centered coordinate system centered on the display unit 110 in the display apparatus 100.

Figure 4:
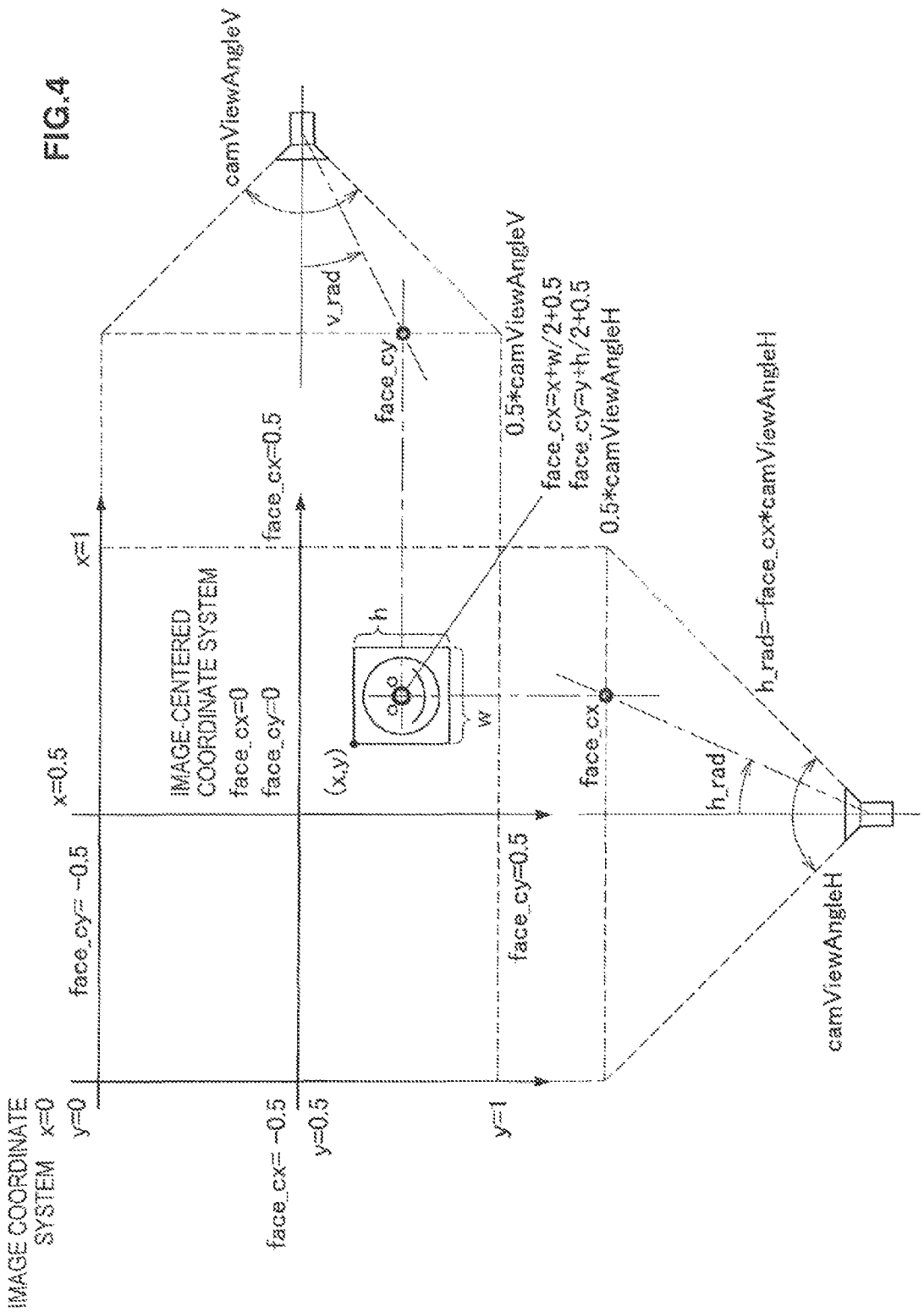
FIG. 4 is an explanatory diagram illustrating conversion processing performed by a face detection unit 142.

FIG. 4 is an explanatory diagram illustrating conversion processing into an image-centered coordinate system face position performed by the face detection unit 142. The conversion from an image coordinate-based face detection position (x,y) (wherein 0≤x, y≤1) into an image-centered coordinate system face position (v_rad,h_rad) (rad) is determined according to the following formulae.

$$v\text{-}rad = face\_cy * camViewAngleH$$

$$h\text{-}rad = face\_cx * camViewAngleH$$

The respective variables have the following meanings.
face_cx: Horizontal direction face detection position in an image-centered coordinate system (−0.5 to 0.5)
face_cy: Perpendicular direction face detection position in an image-centered coordinate system (−0.5 to 0.5)

$$face\_cx : x + w/2 + 0.5$$

$$face\_cy : x + h/2 + 0.5$$

camViewAngleV: Camera perpendicular direction angle of field (rad)
camViewAngleH: Camera horizontal direction angle of field (rad)
w: Face detection width (0 to 1)
h: Face detection height (0 to 1)

Figure 5:
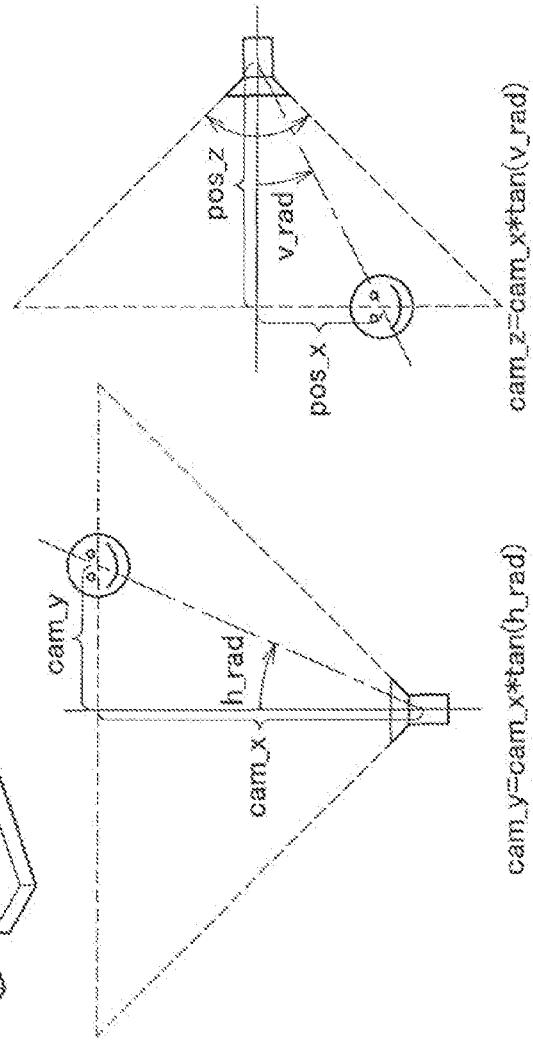
FIG. 5 is an explanatory diagram illustrating conversion processing performed by a face detection unit 142.

FIG. 5 is an explanatory diagram illustrating processing performed by the face detection unit 142 to convert a face position in an image-centered coordinate system into a face position in a camera-centered coordinate system. The conversion from the face position (v_rad,h_rad) (rad) in an image-centered coordinate system into the face position (cam_x, cam_y,cam_z) (mm) in a camera-centered coordinate system can be performed according to formulae like the following.

$$cam\_x = 1000 * FACESIZE\_AT\_1000/w$$

$$cam\_y = cam\_x * \tan(h\_rad)$$

$$cam\_z = cam\_x * \tan(v\_rad)$$

Note that FACESIZE_AT_1000 represents the face size w (0 to 1) when at a distance of 1000 (mm).

Figure 6:
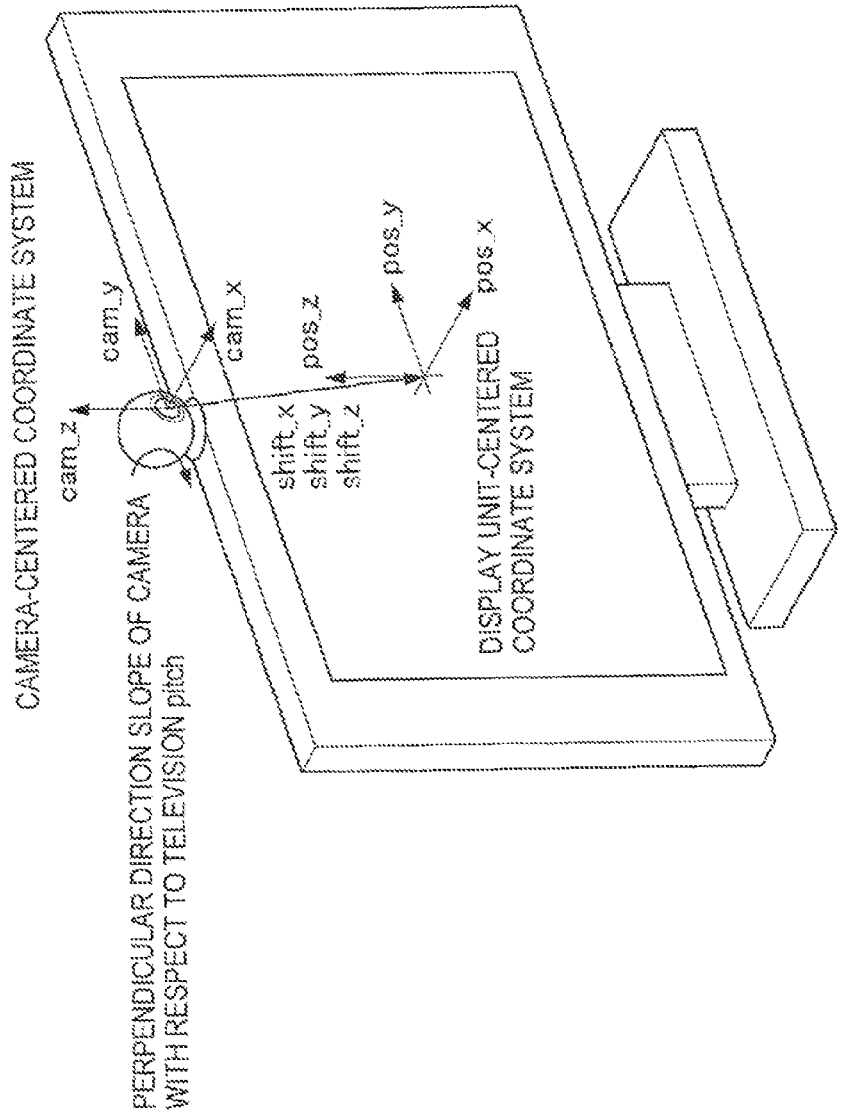
FIG. 6 is an explanatory diagram illustrating conversion processing performed by a face detection unit 142.

FIG. 6 is an explanatory diagram illustrating processing performed by the face detection unit 142 to convert a face position in a camera-centered coordinate system into a face position in a display unit-centered coordinate system centered on the display unit 110 in the display apparatus 100. The conversion from the face position (cam_x,cam_y,cam_z) (mm) in a camera-centered coordinate system into the face position (pos_x, pos_y, pos_z) (mm) in a display unit-centered coordinate system centered on the display unit 110 irr the display apparatus 100 can be performed according to formulae like the follow $$pos\_x = cam\_x * \cos(pitch) + cam\_z * \sin(pitch) + shift\_x$$

$$pos\_y = cam\_y + shift\_y$$

$$pos\_z = cam\_x * \sin(pitch) + cam\_z * \cos(pitch) + shift\_z$$

The respective variables have the following meanings.
pitch: Slope (rad) with respect to the display apparatus 100
shift_{x,y,z}: Deviation (mm) in the x, y, or z direction from the center of the camera 120 to the center of the display unit 110 in the display apparatus 100

Thus, the face detection unit 142 can determine the face position display unit-centered coordinate system from a face detection position based on image coordinates.

Figure 7:
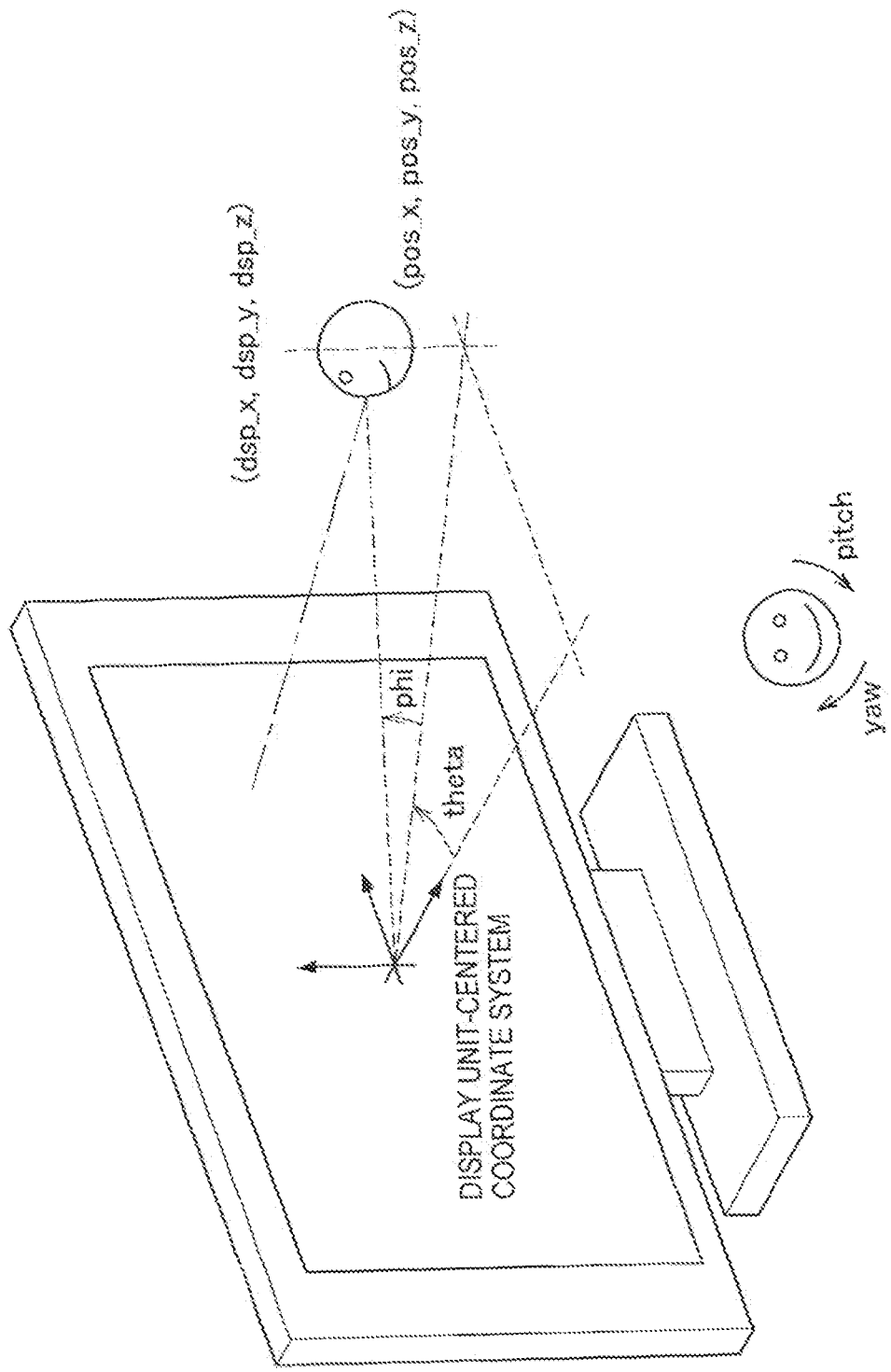
FIG. 7 is an explanatory diagram illustrating calculation of a position on a display area of a display unit 110 indicated by a face detected by a face detection unit 142.

The face detection unit 142 acquires the face detection position (x,y) (0 to 1) and the face orientation (theta,phi) (rad) that the face is facing. Based on a calculation, the face detection unit 142 can determine a position on a display area of the display unit 110 indicated by that face from the face position and the face orientation in a display unit-centered coordinate system. FIG. 7 is an explanatory diagram illustrating calculation of a position on a display area of a display unit 110 indicated by a face detected by the face detection unit 142.

From the face position (pos_x, pos_y, pos_z) (mm) in a display unit-centered coordinate system and the face orientation, the conversion into a position (dsp_x, dsp_y, dsp_z) (mm) on the display area of the display unit 110 indicated by that face can be performed according to the formulae like the following.

$$theta=atan(pas\_y/pos\_x)$$

$$phi=atan(pas\_z/pos\_x)$$

The respective variables have the following meanings.

$$dsp\_x=0.0$$

$$dsp\_y=-pos\_y+pos\_x*tan(yaw+theta)$$

$$dsp\_z=-pos\_y+pos\_x*tan(pitch+phi)$$

Figure 8:
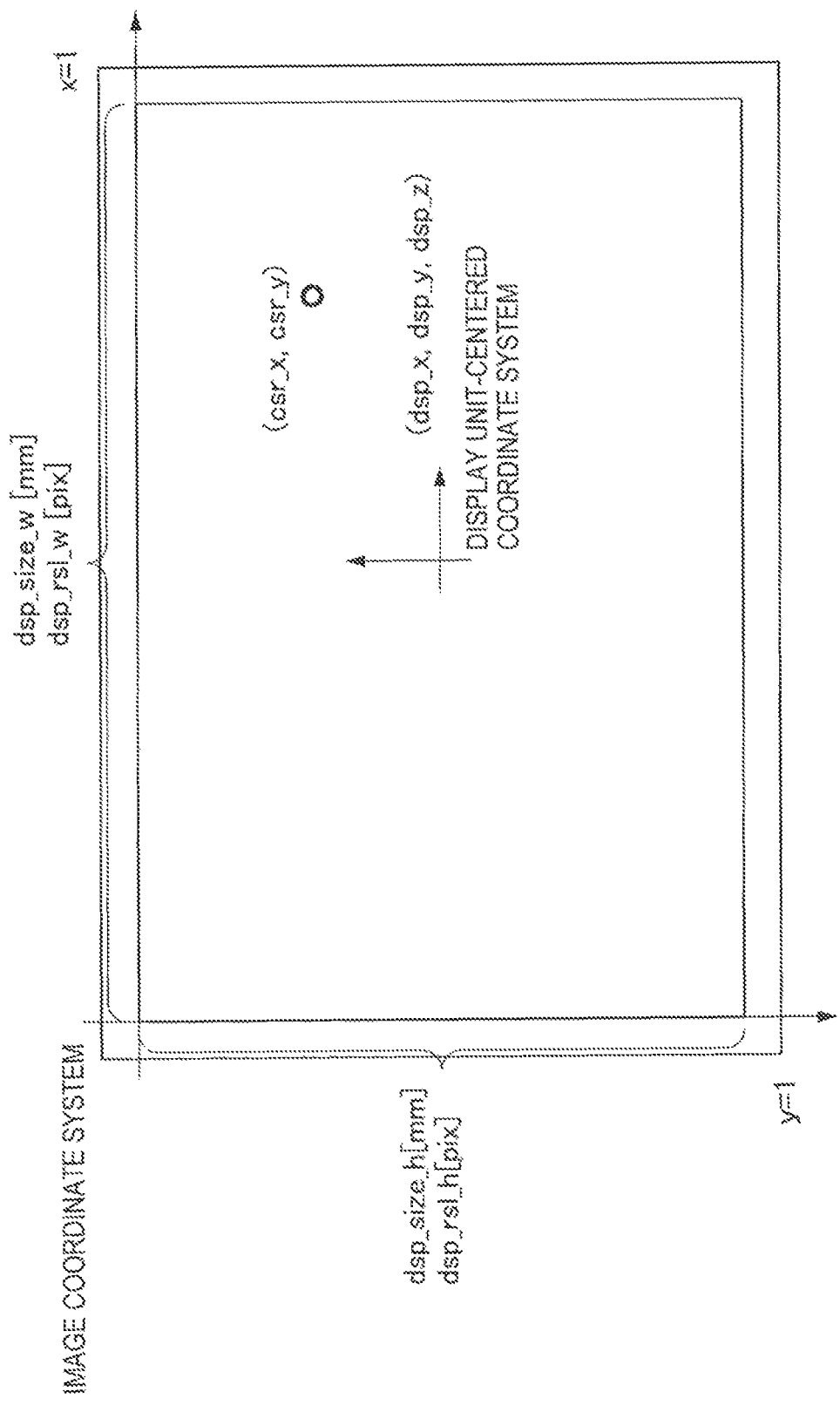
FIG. 8 is an explanatory diagram illustrating conversion processing performed by a face detection unit 142.

FIG. 8 is an explanatory diagram illustrating processing to convert a position on a screen indicated by a face detected by the face detection unit 142 into a cursor position in an image coordinate system. The conversion of the position (dsp_x, dsp_y, dsp_z) (mm) on a screen indicated by a face detected by the face detection unit 142 into a cursor position (csr_x, csr_y) (pixel) in an image coordinate system can be performed according to formulae like the following.

$$csr\_x=(-dsp\_y/dsp\_size\_w+0.5)*dsp\_rsl\_w$$

$$csr\_y=(-dsp\_z/dsp\_size\_h+0.5)*dsp\_rsl\_h$$

The respective variables have the following meanings.
dsp_size_w: Display horizontal width length (trim)
dsp_size_h: Display vertical width length (mm)
dsp_rsl_w: Display horizontal width resolution (pix)
dsp_rsl_h: Display vertical width resolution (pix)

Thus, from the face position and the face orientation in a camera-centered coordinate system, the area (coordinates) on the display area of the display unit 110 indicated by that face can be determined.

Next, the gesture detection processing performed by the gesture detection unit 144 will be described in more detail based on a specific example. For example, when the user faces the camera 120, and changes his/her hand into a specific shape, such as a first ("rock" in rock-paper-scissors), or an open palm ("paper" in rock-paper-scissors), the hand is detected by the gesture detection unit 144, and tracking of the hand movements (hand tracking) is started.

When the fact that a specific operation was performed by the user is detected from the image data, the gesture detection unit 144 estimates the hand position in a camera-centered coordinate system from the detected position based on the image coordinates. The estimation processing of the hand position by the gesture detection unit 144 is carried out in a similar manner to the above-described face detection unit 142.

The gesture detection unit 144 determines a cursor position (csr_$x_{t+dt}$, csr_$y_{t+dt}$) in an image coordinate system after a predetermined time dt according to the following formulae based on the movement amount (dHw, dHh) (mm/s) in the horizontal and perpendicular directions for the estimated hand position in a camera-centered coordinate system.

$$csr\_x_{t+dt}=csr\_x_t+gain*dHw$$

$$csr\_y_{t+dt}=csr\_h_t+gain*dHh$$

Note that "gain" is a coefficient. By varying the gain value, the movem amount of the cursor based on hand tracking can be adjusted.

The only time that the face information has an influence on the cursor is when the hand tracking starts. While the hand tracking is continuing, the face information does not have any influence on the movement of the cursor. While the hand tracking is continuing, the display apparatus 100 controls the cursor using information about the position of the user's hand that has been detected by the gesture detection unit 144.

The display apparatus 100 according to an embodiment of the present disclosure can easily move the cursor to a target position by performing the above-described operations so that large movements of the cursor are made using face information, and after the cursor has been moved using face information, finer movements of the cursor are made based on movement of the hand.

Figure 9A:
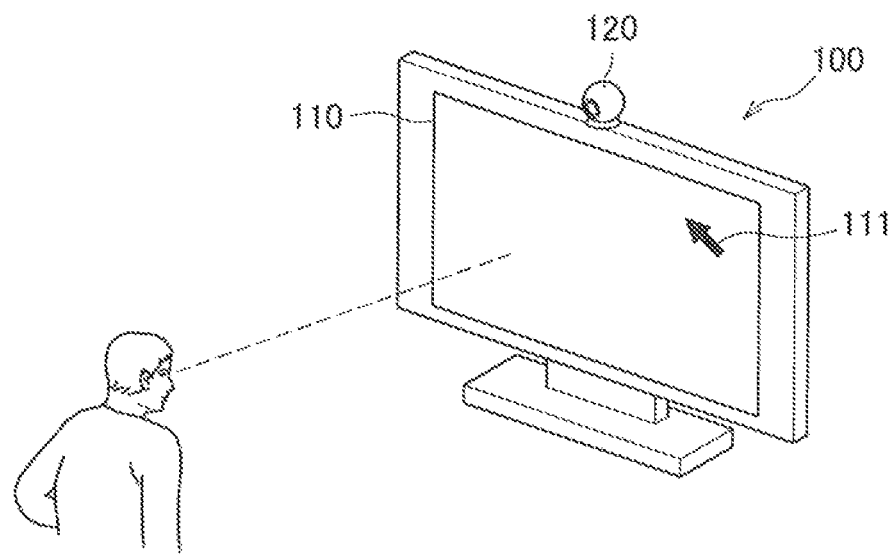
FIG. 9A is an explanatory diagram illustrating a control example of a display apparatus 100 according to an embodiment of the present disclosure.
Figure 9B:
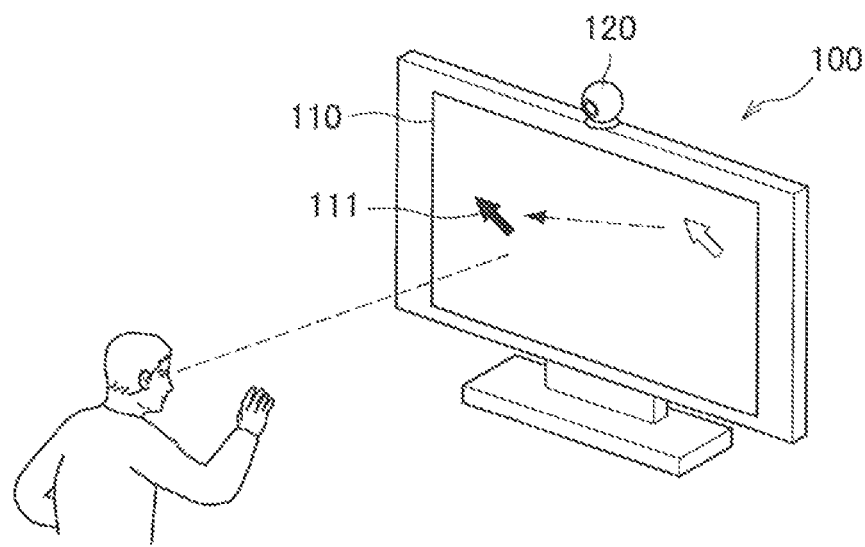
FIG. 9B is an explanatory diagram illustrating a control example of a display apparatus 100 according to an embodiment of the present disclosure.
Figure 9C:
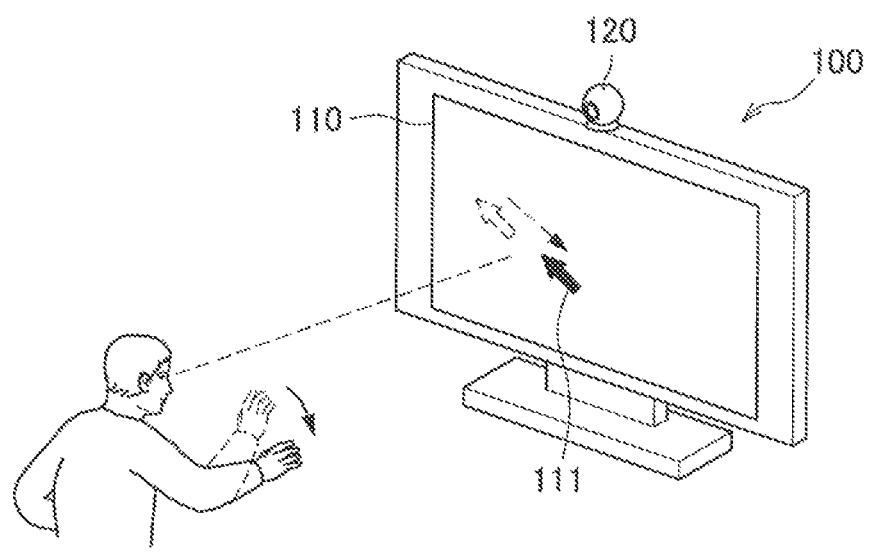
FIG. 9C is an explanatory diagram illustrating a control example of a display apparatus 100 according to an embodiment of the present disclosure.

FIGS. 9A to 9C are explanatory diagrams illustrating control examples of the display apparatus 100 according to an embodiment of the present disclosure. FIGS. 9A to 9C illustrate examples of controlling the movement of the cursor displayed on the display unit 110 based on the user facing the display apparatus 100 according to an embodiment of the present disclosure and moving his/her face and/or performing a predetermined gesture. In FIGS. 9A to 9C, examples are illustrated of a web browser displayed by the display apparatus 100, which is operated based on the user facing the display apparatus 100 and moving his/her face and/or raising his/her arm.

FIG. 9A illustrates a state in which, with a cursor 111 being displayed by the information display unit 160 on the display unit 110 in the display apparatus 100, a user facing the display apparatus 100 looks in the direction of a given location L1 of the display unit 110 that is not a display position of the cursor 111. Thus, when the user is simply looking in the direction of the given location L1 of the display unit 110, the information display unit 160 does not move the display position of the cursor 111 to the location L1.

FIG. 9B illustrates a state in which, with the cursor 111 being displayed by the information display unit 160 on the display unit 110 in the display apparatus 100, a user facing the display apparatus 100 looks in the direction of the given location L1 of the display unit 110 that is not a display position of the cursor 111, and performs a gesture in which his/her hand is raised. When the user performs a gesture of raising his/her hand while looking in the direction of the given location L1 of the display 110, the camera 120 captures an image of the user, the operation detection unit 140 detects the orientation of the user's face and the user gesture from the captured image data, the area selection unit 150 selects the position (location L1) of the display unit 110 based on the detection result of the operation detection unit 140, and the information display unit 160 displays the cursor at the position selected by the area selection unit 150.

Note that when changing from the state in FIG. 9A to the state in FIG. 9B, the display apparatus 100 can move the cursor 111 in a manner that lets the user see the movement trajectory of the cursor 111, or can instantly move the cursor 111 without showing the trajectory. Further, when changing from the state in FIG. 9A to the state in FIG. 9B, the display apparatus 100 may highlight the cursor 111 (e.g., the surrounding of the cursor 111 may be lit up) to let the user know that the cursor 111 has moved.

FIG. 9C illustrates a state in which, following on from the state illustrated in FIG. 9B, a user facing the display apparatus 100 moves his/her raised right hand. When a user facing the display apparatus 100 moves his/her raised right hand following on from the state illustrated in FIG. 9B, the camera 120 captures an image of the user, the operation detection unit 140 detects the user gesture from the captured image data, the area selection unit 150 selects the position of the display unit 110 based on the detection result of the operation detection unit 140, and the information display unit 160 displays the cursor at the position selected by the area selection unit 150. Namely, if the user moves his/her hand to the right, the information display unit 160 performs a control to move the cursor to the right, and if the user moves his/her hand to the left, the information display unit 160 performs a control to move the cursor to the left.

As illustrated in FIG. 9C, when the display apparatus 100 moves the cursor 111 by tracking the movement of the user's arm, the display apparatus 100 may select a link on a web page displayed by a web browser, for example, when it has been detected that the user has performed a separate operation lowering a raised arm in front of the body etc.).

Note that, as illustrated in FIG. 9C, even if a user facing the display apparatus 100 changes the orientation of his/her face while moving his/her raised right hand, the display apparatus 100 does not track the changes in the orientation of his/her face when displaying the cursor. To make large movements of the cursor position, for example, the user lowers his/her right arm, shifts the orientation of his/her face to match the position that he/she wants to the cursor to be displayed, raises his/her right arm once more, and clenches and opens his/her hand. When the display apparatus 100 detects that the user has lowered his/her right arm and then raised his/her right arm once more, the display apparatus 100 executes a control to display the cursor at the position that the user's face is looking at that point.

Thus, the display apparatus 100 can control movement of the cursor displayed on the display unit 110 based on a result obtained by capturing an image of the user with the camera 120.

Figure 10:
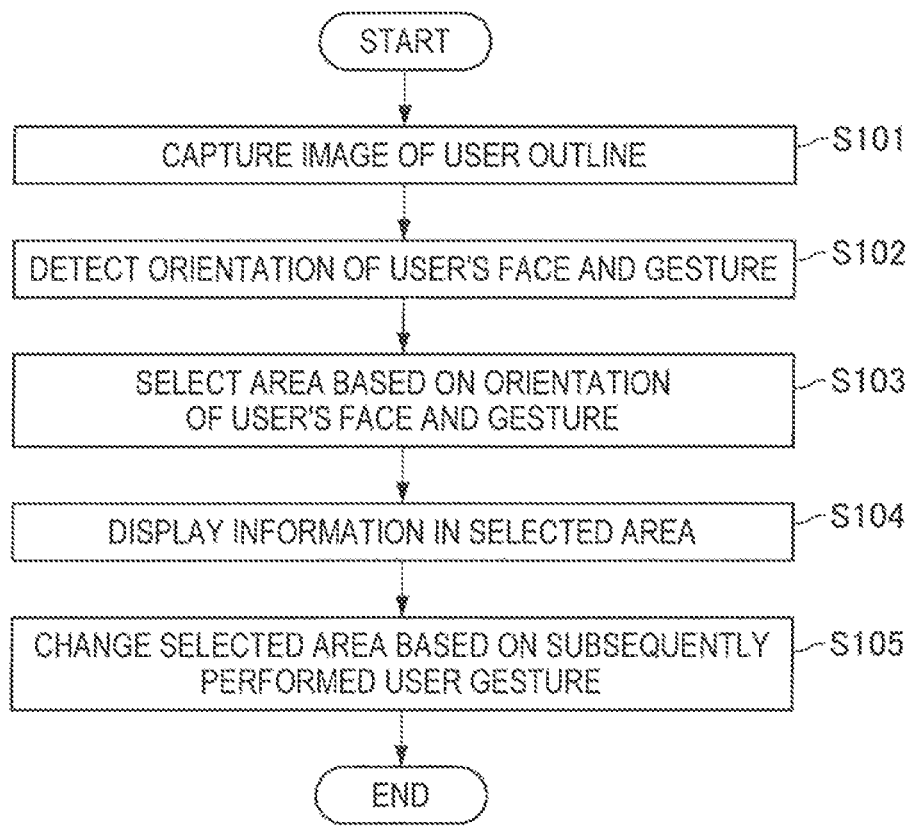
FIG. 10 is a flow diagram illustrating operation of a display apparatus 100 according to an embodiment of the present disclosure.

FIG. 10 is a flow diagram illustrating operation of the display apparatus 100 according to an embodiment of the present disclosure. The flow diagram of FIG. 10 illustrates the operations performed when the display apparatus 100 recognizes a user's face and a gesture from image data captured by the camera 120, and displays information on the display unit 110 based on the recognition result. The operations performed by the display apparatus 100 according to an embodiment of the present disclosure will now be described with reference to FIG. 10.

To recognize a user's face and a gesture, and display information on the display unit 110 based on the recognition result, first, the display apparatus 100 captures an image of the user's outline with the camera 120 included in the display apparatus 100 (step S101). Then, when an image of the user's shape has been captured with the camera 120 included in the display apparatus 100, the display apparatus 100 detects the orientation of the user's face and a user gesture from the image data captured by the camera 120 (step S102). The detection of the orientation of the user's face and the user gesture is carried out by the operation detection unit 140. The detection of the orientation of the user's face and the user gesture by the operation detection unit 140 is performed based on processing such as that described above.

Then, when the orientation of the user's face and the user gesture has been detected from the image data captured by the camera 120 in step S102, the display apparatus 100 selects an area on the display area of the display unit 110 based on the detected orientation of the user's face and user gesture (step S103). The selection of the area on the display area of the display unit 110 based on the detected orientation of the user's face and user gesture is executed by the area selection unit 150.

Then, when the area on the display area of the display unit 110 has been selected based on the detected orientation of the user's face and user gesture in step S103, the display apparatus 100 displays information (an icon, a menu etc.) on the area on the display area of the display unit 110 selected in step S103 (step S104). The display of information on the area on the display area of the display unit 110 selected in step S103 is executed by the information display unit 160.

Then, when the display apparatus 100 has displayed in step S104 the information (an icon, a menu etc.) on the area on the display area of the display unit 110 selected in step S103, the display apparatus 100 detects the user gesture performed subsequently after the gesture detected in step S102, and changes the selected area on the display area of the display unit 110 based on that gesture (step S105). The changing of the selection area on the display area of the display unit 110 is executed by the area selection unit 150.

The processing performed in step S105 corresponds to the control illustrated in FIG. 9C. Namely, after the user's right arm has been raised, if the operation detection unit 140 detects that the right arm has been moved, the area selection unit 150 changes the selection area based on the detection result from the operation detection unit 140, and the information display unit 160 moves the cursor 111 displayed on the display unit 110 based on the selection area changed by the area selection unit 150.

By executing such a series of processes, the display apparatus 100 can detect the orientation of the user's face and user gestures, select an area from among the display area of the display unit 110 using that detection result, and display information on that selected area.

For example, if the user is looking in the direction of the display unit 110, when the display apparatus 100 detects the position that the user is looking from among the display area of the display unit 110, and further detects that the user has performed a specific operation (e.g., raising of the right arm), the display apparatus 100 displays the cursor at the position that the user is looking. Then, in a state in which the cursor is displayed on the display unit 110 based on the user having looked in the direction of the display unit 110 and performed the above-described specific operation, if the display apparatus 100 detects that the user has performed another separate specific operation (e.g., moving the raised right arm), the display apparatus 100 can move the cursor displayed on the display unit 110 based on that operation.

Operation of the display apparatus 100 was described above. In the above description, although an example was described in which the display apparatus 100 displayed a web browser, and that web browser was operated using a cursor, obviously the present disclosure is not limited to such an example.

For example, when the display apparatus 100 is displaying content such as moving images or a still image, even if the user is made to perform a control such as selecting or playing/stopping the content, the display apparatus 100 can execute the above-described control based on detection of the face orientation and/or a gesture.

FIG. 11 is an explanatory diagram illustrating an example of a screen displayed on the display unit 110 in the display apparatus 100, FIG. 11 illustrates a state in which, when content C1 is displayed on the display unit 110, a menu M1 is displayed based on a user gesture. To display this menu M1, for example, the user looks at the area on which the menu M1 is displayed, and performs a specific operation (e.g., raising his/her right arm). The display apparatus 100 detects the orientation of the user's face when the user performed the specific operation. If the user's face is looking at the area on which the menu M1 is displayed, the menu M1 is displayed on the display unit 110 by the information display unit 160.

Note that although an example is illustrated in FIG. 11 in which the menu M1 is displayed on an area on the right side of the display unit 110, the present disclosure is not limited to such an example. For example, when the operation detection unit 140 detects that the above-described specific operation has been performed with the user looking at an area on the left side of the display unit 110), the menu M1 may be displayed on an area on the left side of the display unit 110. Further, for example, if a separate menu different to menu M1 is to be displayed on an area on the left side of the display unit 110, the display apparatus 100 may be configured so that the menu M1 is displayed when the user looks at an area on the right side of the display unit 110 and performs a specific operation, and a menu different to the menu M1 is displayed when the user looks at an area on the left side of the display unit 110 and performs a specific operation.

In FIG. 11, a case is illustrated in which, when the display apparatus 100 is displaying content such as moving images or a still image, the user is made to perform a control such as selecting or playing/stopping the content. Next, a case will be described in which the user is made to select one area from among a plurality of areas of the display unit 110.

FIG. 12 is an explanatory diagram illustrating an example of a screen displayed on the display unit 110 in the display apparatus 100. In FIG. 12, an example is illustrated in which the user is made to select one area from among 6 areas R1 to R6. Note that what is displayed in the six areas R1 to R6 may be content such as moving images or a still image, or may be a reduced-size display of a web page displayed by the web browser.

To select one area from among the six areas R1 to R6, the user looks in the direction of one of the six areas R1 to R6, and performs a specific operation (e.g., raises his/her right arm). The display apparatus 100 detects the orientation of the user's face when the user performed the specific operation. If the user is looking at one of the areas R1 to R6, the display apparatus 100 selects that area and then, for example, enlarges the reduced-size web page and displays it across the whole screen.

The display apparatus 100 may also detect the orientation of the user's face when the user performed the specific operation, and change the displayed operation based on the direction that the face is looking. For example, if the user wants to vertically scroll up or down a vertically-long web page displayed on the display unit 110 by the display apparatus 100, the user performs a specific operation (e.g., raises his/her right arm) while looking at an upper section or a lower section of the display area of the display unit 110. If the user was looking at an upper section of the display area of the display unit 110 when that operation was performed, the display apparatus 100 can scroll the web page displayed on the display unit 110 upwards, and if the user was looking at a lower section of the display area of the display unit 110, the display apparatus 100 scrolls the web page displayed on the display unit 110 downwards. Even when the user wants to scroll in a left-right direction, scrolling in the left-right direction can be performed by similarly detecting the orientation of the user's face.

When the user operates the cursor by moving his/her arm, there is a limit to the range that the user can move his/her arm. Therefore, when the user has performed a specific operation (e.g., raising his/her fight arm), the display apparatus 100 may display on the display unit 110 the movable range over which the user can operate.

FIGS. 13A and 13B are explanatory diagrams illustrating examples of a screen displayed on the display unit 110 in the display apparatus 100. FIGS. 13A and 13B illustrate examples in which a movable range S1 over which the user can operate the cursor 111 is displayed on the display unit 110 by the display apparatus 100 when the user has performed a specific operation (e.g., raising his/her right arm). Note that the user's movable range may be determined from the orientation of the user's face and the user's posture when the user performed the specific operation.

For example, when the user displays the cursor 111 at a location where the user is looking by raising his/her right arm, if the right arm is raised near his/her face, the movable range S1 of the cursor 111 is, as illustrated in FIG. 13A, defined by a roughly circular shape centered on the position where the cursor 111 is displayed. On the other hand, if the right arm is raised far away from his/her face, the movable range S1 of the cursor 111 is a shape like that illustrated in FIG. 13B.

The display apparatus 100 may change the operation control based on differences with a detected specific operation. For example, the display apparatus 100 may be configured so as to, when the user has raised his/her right arm, execute a different operation by recognizing differences in the shape of the hand between when the user has again clenched his/her and or whether the right hand is open.

The display apparatus 100 can prompt the user to perform a reset operation for resetting the processing if the position of the processing target and the position of the detected face are separated by a predetermined amount or more. For example, if a specific operation (e.g., raising his/her right arm) by the user is detected and the cursor is displayed on the display unit 110, if the position that the user's face is looking at while the user is facing the display unit 110 and the position of the cursor displayed on the display unit 110 are separated by a predetermined distance, the display apparatus 100 can display on the display unit 110 information prompting the user to perform a reset operation for resetting the cursor display.

The display apparatus 100 can also change the speed gain of the cursor displayed on the display unit 110 based on, after the user performs a specific operation and the cursor is displayed on the display unit 110, a distance between the position of the user's face and the position of the site where the user performed the specific operation. For example, if the distance is close between the position of the user's face and the position of the site where the user performed the specific operation, the movement speed of the cursor based on movement of the user's arm may be decreased, while if the distance is far between the position of the user's face and the position of the site where the user performed the specific operation, the movement speed of the cursor based on movement of the user's arm may be increased.

After the cursor is displayed on the display unit 110, the display apparatus 100 can also change the movement speed of the cursor based on the presence/absence of content that can be selected around the cursor. For example, after the cursor is displayed on the display unit 110, if there is a plurality of content that can be selected around the cursor, in order to facilitate content selection, the display apparatus 100 can decrease the movement speed of the cursor, and if there is only one piece of content or no content at all that can be selected around the cursor, to emphasize cursor operability, the display apparatus 100 can increase the movement speed of the cursor.

Although in the above description the display apparatus 100 displayed the cursor on the display unit 110 based on the orientation of the face when the user performed a specific operation, especially a physical operation, the present disclosure is not limited to this. For example, the display apparatus 100 can display the cursor on the display unit 110 based on the orientation of the user's face when the user issued a specific sound.

Figure 14:
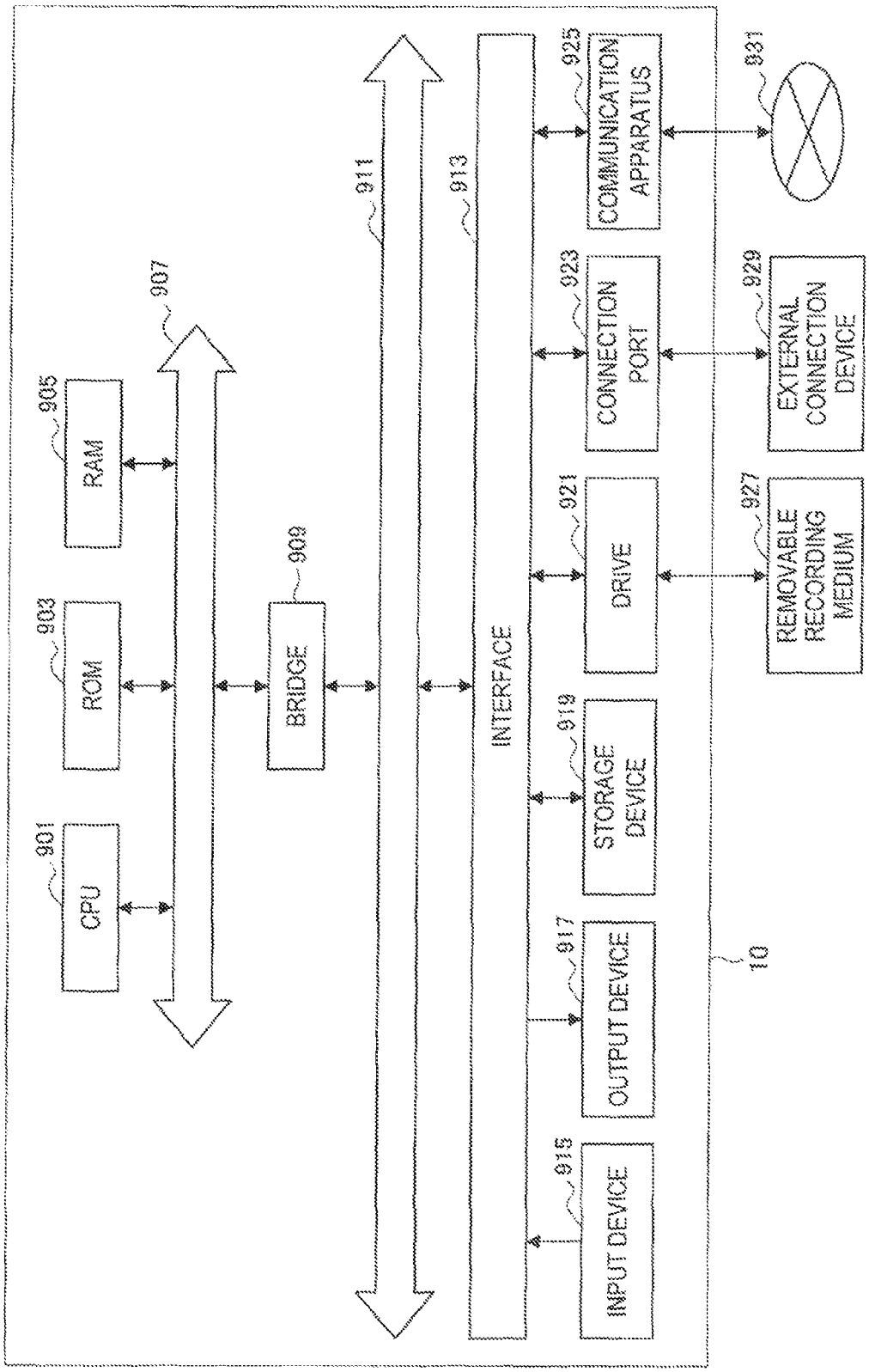
FIG. 14 is a block diagram illustrating a hardware configuration of a tills apparatus 100 according to an embodiment of the present disclosure.

Next, a hardware configuration of the display apparatus 100 according to an embodiment of the present disclosure will be described in more detail with reference to FIG. 14. FIG. 14 is a block diagram illustrating a hardware configuration of the display apparatus 100 according to an embodiment of the present disclosure.

The display apparatus 100 mainly includes a CPU 901, a ROM 903, and a RAM 905. Further, the display apparatus 100 further includes a host bus 907, a bridge 909, an external bus 911, an interface 913, an input device 915, an output device 917, a storage device 917, a drive 921, a connection port 923, and a communication apparatus 925.

The CPU 901, which functions as a calculation processing device and a control device, controls all or a part of the operations in the display apparatus 100 based on various programs recorded in the ROM 903, RAM 905, storage device 917, or a removable recording medium 927. The ROM 903 stores programs, calculation parameters and the like used by the CPU 901. The RAM 905 temporarily stores the programs to be used by the CPU 901, and parameters that appropriately change during program execution. These units are connected to each other by the host bus 907, which is configured from an internal bus such as a CPU bus.

The host bus 907 is connected to the external bus 911, which is a PCI (peripheral component interconnect/interface) bus or the like.

The input device 915 is an operation device that is operated by the user, such as a mouse, keyboard, touch panel, button, switch, lever and the like. The input device 915 may be, for example, a remote control device (a so-called "remote control") that utilizes infrared rays or other radio waves, or may be an external connection device 929, such as a mobile telephone or a PDA that supports the operations of the display apparatus 100. The input device 915 includes, for example, an input control circuit that generates an input signal based on information input by the user using the above-described operation device, and outputs the generated input signal to the CPU 901. The user of the display apparatus 100 can input various types of data into the display apparatus 100 and issue processing operation instructions by operating this input device 915.

The output device 917 is configured from a device that can visually or aurally notify the user of acquired information. Examples of such a device include a display device such as a CRT display, a liquid crystal display device, a plasma display panel device, an organic EL display, and a lamp, an audio output device such as a speaker or headphones, a printer apparatus, a mobile telephone, a facsimile and the like. The output device 917 outputs results obtained based on various processes performed by the display apparatus 100, for example. Specifically, the display apparatus displays results obtained based on various processes performed by the display apparatus 100 as text or an image. On the other hand, the output device 917 converts played-back audio data or an audio signal formed from audio data into an analog signal, and outputs the converted analog signal.

The storage device 919 is a device for storing data that is configured as an example of the storage unit of the display apparatus 100. The storage device 919 is configured from, for example, a magnetic storage unit device such as a HDD (hard disk drive), a semiconductor storage device, an optical storage device, a magneto-optical storage device and the like. This storage device 919 stores programs and various types of data executed by the CPU 901, and various types of externally-acquired data, for example.

The drive 921 is a reader/writer for a recording medium, and is installed in the display apparatus 100 or is externally attached. The drive 921 reads information recorded on a mounted removable recording medium 927, such as a magnetic disk, an optical disc, a magneto-optical disk, or a semiconductor memory; and outputs the read information to the RAM 905. Further, the drive 921 can also write information onto a mounted removable recording medium 927, such as a magnetic disk, an optical disc, a magneto-optical disk, or a semiconductor memory, and outputs the read information to the RAM 905. Examples of the recording medium 927 include CompactFlash® (CF), a flash memory, or a SD memory card (secure digital memory card) and the like. Further, the recording medium 927 may also be a IC card (integrated circuit card) on which a non-contact IC chip is mounted, an electronic device and the like.

The connection port 923 is a port for directly connecting a device to the display apparatus 100. Examples of the connection port 923 include, for example, a USB (universal serial bus) port, an IEEE 1394 port, a SCSI (small computer system interface) port, and the like. Further examples of the connection port 923 include an RS-232C port, an optical audio terminal, a HDMI (high-definition multimedia interface) port and the like. By connecting the external connection device 929 to the connection port 923, the display apparatus 100 directly acquires various types of data from the external connection device 929 and provides various types of data to the external connection device 929.

The communication apparatus 925 is a communication interface configured from a communication device for connecting to a communication network 931, for example. The communication apparatus 925 may be a wired or a wireless LAN (local area network), Bluetooth®, or WUSB (wireless USB) communication card, for example. Further, the communication apparatus 925 may be an optical communication router, an ADSL (asymmetric digital subscriber line) router, or a modem used for various types of communication. This communication apparatus 925 can, for example, transmit and receive signals and the like based on a predetermined protocol such as TCP/IP, for example, to/from the Internet or another communication device. In addition, the communication network 931 connected to the communication apparatus 925 is configured from a wired or wirelessly connected network, and may be, for example, the Internet, a home LAN, infrared communication, radio wave communication, satellite communication or the like.

In the above, an example was illustrated of hardware configuration that can be executed by the display apparatus 100 according to an embodiment of the present disclosure. The above-described constituent elements may be configured using multi-purpose parts or from hardware specialized for the function of each constituent element. Therefore, the utilized hardware configuration may be appropriately modified based on the technological level at the time of implementing the present disclosure.

<2. Summary>

According to the display apparatus 100 according to an embodiment of the present disclosure as described above, the position of the face of a user who is looking at a display unit 110 in the display apparatus 100 and a user operation are detected. When the display apparatus 100 according to an embodiment of the present disclosure detects that the user has performed a specific operation, the display apparatus 100 selects an area of the display unit 110 based on the position of the face at that time, and displays predetermined information (a cursor or a menu) on that selected area.

The display apparatus 100 according to an embodiment of the present disclosure can facilitate a remote operation that is performed based on detection of a specific gesture when the user tries to perform a gesture-based remote operation.

Operation of the display apparatus 100 according to an embodiment of the present disclosure described above can be performed by hardware or by software. If performing by software, for example, operation can be performed by a CPU or some other control apparatus provided in the display apparatus 100 reading and sequentially executing computer programs stored on a recording medium, such as a ROM, provided in the display apparatus 100.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
an operation detection unit configured to detect an orientation of a user's face: and operations performed by the user; and
an area selection unit configured to, when the operation detection unit detects that the user has performed a first operation, select an area on a screen based on the orientation of the user's face during the first operation.

(2) The information processing apparatus according to (1), wherein when the operation detection unit detects that the user has switched from the first operation to a second operation, the area selection unit is configured to change the selected area based on the second operation.

(3) The information processing apparatus according to (1) or (2), further including
an information display unit configured to display information on the screen,
wherein the information display unit is configured to display information on an area on the screen selected by the area selection unit.

(4) The information processing apparatus according to (3), wherein the information display unit is configured to display information based on a position of the user's face detected by the operation detection unit.

(5) The information processing apparatus according to (3) or (4), wherein the information display unit is configured to change the displayed information based on a content of the first operation detected by the operation detection unit.

(6) The information processing apparatus according to any one of (3) to (5),wherein rein the information display unit is configured to change a display when the user has performed the first operation based on the orientation of the face detected by the operation detection unit.

(7) The information processing apparatus according to any one of (3) to (6), wherein the information display unit is configured to display a cursor on the area on the screen selected by the area selection unit.

(8) The information processing apparatus according to any one of (3) to (7), wherein the information display unit is configured to display on the screen a user operable area at a point when the user performed the first operation.

(9) The information processing apparatus according to any one of (3) to 8), wherein, if the area selected by the area selection unit and the area selected by the area selection unit based on the orientation of the user's face detected by the operation detection unit are separated by a predetermined amount or more, the information display unit is configured to display on the screen information prompting a reset operation for resetting selection by the area selection unit.

(10) The information processing apparatus according to any one of (2) to (9), wherein when the operation detection unit detects that the user has switched from the first operation to the second operation, the area selection unit is configured to change a speed for changing the area selected based on the second operation, based on a distance between a position where the user performed the second operation and a position of the user's face detected by the operation detection unit.

(11) The information processing apparatus according to any one of (2) to (10), wherein when the operation detection unit detects that the user has switched from the first operation to the second operation, the area selection unit is configured to change the area selected based on the second operation, and change a speed for changing the area selected based on the second operation based on a number of pieces of content around the selected area.

(12) An information processing method including:
detecting an orientation of a user's face and operations performed by the user; and
when performance of a first operation by the user is detected, selecting an area on a screen based on the orientation of the user's face during the first operation.

(13) A computer program configured to make a computer:
detect an orientation of a user's face and operations performed by the user; and
when performance of a first operation by the user is detected, select an area on a screen based on the orientation of the user's face during the first operation.

The present disclosure contains subject matter related to that disclosed in Japanese Priority Patent Application JP 2012-076211 filed in the Japan Patent Office on Mar. 29, 2012, the entire content of which is hereby incorporated by reference.

What is claimed is:

1. An information processing apparatus comprising:
an operation detection unit configured to detect an orientation of a user's face and to detect operations performed by the user;
an area selection unit configured to, when the operation detection unit detects that the user has performed a first operation, select an area on a screen based on the orientation of the user's face during the first operation; and
an information display unit configured to display information on the area on the screen selected by the area selection unit, and to change the display of the information based on a content of the first operation,
wherein the operation detection unit, the area selection unit, and the information display unit are each implemented via at least one processor.

2. The information processing apparatus according to claim 1, wherein when the operation detection unit detects that the user has switched from the first operation to a second operation, the area selection unit is configured to change the selected area based on the second operation.

3. The information processing apparatus according to claim 2, wherein when the operation detection unit detects that the user has switched from the first operation to the second operation, the area selection unit is configured to change a speed for changing the area selected based on the second operation, based on a distance between a position where the user performed the second operation and a position of the user's face detected by the operation detection unit.

4. The information processing apparatus according to claim 2, wherein when the operation detection unit detects that the user has switched from the first operation to the second operation, the area selection unit is configured to change the area selected based on the second operation, and change a speed for changing the area selected based on the second operation based on a number of pieces of content around the selected area.

5. The information processing apparatus according to claim 1, wherein the information display unit is configured to display information based on a position of the user's face detected by the operation detection unit.

6. The information processing apparatus according to claim 1, wherein the information display unit is configured to change a display when the user has performed the first operation based on the orientation of the face detected by the operation detection unit.

7. The information processing apparatus according to claim 1, wherein the information display unit is configured to display a cursor on the area on the screen selected by the area selection unit.

8. The information processing apparatus according to claim 1, wherein the information display unit is configured to display on the screen a user operable area at a point when the user performed the first operation.

9. The information processing apparatus according to claim 1, wherein, if the area selected by the area selection unit and on which the information is displayed and the area selected by the area selection unit based on the orientation of the user's face detected by the operation detection unit are separated by a predetermined amount or more, the information display unit is configured to display on the screen information prompting a reset operation for resetting selection by the area selection unit.

10. The information processing apparatus according to claim 1, wherein, when the operation detection unit detects that the user has performed the first operation, the area selection unit selects the area on the screen based on the orientation of the user's face detected during the performing of the first operation.

11. The information processing apparatus according to claim 1, wherein the orientation of the user's face corresponds to a focusing area upon the screen towards which the user gazes.

12. The information processing apparatus according to claim 1, wherein the operations performed by the user are motions or gestures made by the user.

13. The information processing apparatus according to claim 1, wherein the first operation is a gesture operation and the display of the information is changed by moving the information on the screen based on the gesture operation.

14. The information processing apparatus according to claim 13, wherein the displayed information is a cursor or an icon.

15. The information processing apparatus according to claim 1, wherein the displayed information is a cursor or an icon.

16. The information processing apparatus according to claim 1, wherein the displayed information is a display menu.

17. The information processing apparatus according to claim 1, wherein the gesture operation is a gesture made by a hand or arm of the user.

18. An information processing method comprising:
    detecting an orientation of a user's face;
    detecting operations performed by the user;
    selecting, when performance of a first operation by the user is detected, an area on a screen based on the orientation of the user's face during the first operation;
    displaying information on the area on the screen selected by the area selection unit; and
    changing the display of the information based on a content of the first operation.

19. A non-transitory computer-readable medium having embodied thereon a program, which when executed by a computer causes the computer to execute a method, the method comprising:
    detecting an orientation of a user's face;
    detecting operations performed by the user;
    selecting, when performance of a first operation by the user is detected, an area on a screen based on the orientation of the user's face during the first operation;
    displaying information on the area on the screen selected by the area selection unit; and
    changing the display of the information based on a content of the first operation.

* * * * *